US009886389B2

United States Patent
Dumarot et al.

(10) Patent No.: US 9,886,389 B2
(45) Date of Patent: *Feb. 6, 2018

(54) CACHE MEMORY BYPASS IN A MULTI-CORE PROCESSOR (MCP)

(75) Inventors: Dan P. Dumarot, Cornwall, NY (US); Karl J. Duvalsaint, Lagrangeville, NY (US); Daeik Kim, White Plains, NY (US); Moon J. Kim, Wappingers Falls, NY (US); Eugene B. Risi, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 860 days.

This patent is subject to a terminal disclaimer.

(21) Appl. No.: 12/276,072

(22) Filed: Nov. 21, 2008

(65) Prior Publication Data

US 2010/0131717 A1 May 27, 2010

(51) Int. Cl.
*G06F 12/08* (2016.01)
*G06F 12/0888* (2016.01)
(Continued)

(52) U.S. Cl.
CPC ...... *G06F 12/0888* (2013.01); *G06F 11/1666* (2013.01); *G06F 12/0811* (2013.01);
(Continued)

(58) Field of Classification Search
CPC ............. G06F 12/0811; G06F 12/0888; G06F 12/0813; G06F 12/084
(Continued)

(56) References Cited

U.S. PATENT DOCUMENTS 4,357,656 A * 11/1982 Saltz ................... G06F 12/0888
  711/113
5,721,883 A 2/1998 Katsuo et al.
(Continued)

FOREIGN PATENT DOCUMENTS

CN 1427340 A 7/2003
CN 1474969 A 2/2004
(Continued)

OTHER PUBLICATIONS

Sohi, G.S.; , "Cache memory organization to enhance the yield of high performance VLSI processors," Computers, IEEE Transactions on , vol. 38, No. 4, pp. 484-492, Apr. 1989.*
(Continued)

*Primary Examiner* — David X Yi
*Assistant Examiner* — Ramon A Mercado
(74) *Attorney, Agent, or Firm* — William H. Hartwell; Hunter E. Webb; Keohane & D'Alessandro PLLC

(57) ABSTRACT

This invention describes an apparatus, computer architecture, memory structure, memory control, and cache memory operation method for multi-core processor. A logic core bypasses immediate cache memory units with low yield or deadly performance. The core mounts (multiple) cache unit(s) that might already be in use by other logic cores. Selected cache memory units serve multiple logic cores with the same contents. The shared cache memory unit(s) serves all the mounting cores with cache search, hit, miss, and write back functions. The method recovers a logic core whose cache memory block is not operational by sharing cache memory blocks which might already engage other logic cores. The method is used to improve reliability and performance of the remaining system.

16 Claims, 3 Drawing Sheets

(51) Int. Cl.
*G06F 11/16* (2006.01)
*G06F 12/0811* (2016.01)
G06F 11/20 (2006.01)
G06F 12/0813 (2016.01)
G06F 12/084 (2016.01)

(52) U.S. Cl.
CPC ...... *G06F 11/2035* (2013.01); *G06F 11/2043* (2013.01); *G06F 12/084* (2013.01); *G06F 12/0813* (2013.01); *G06F 2212/1032* (2013.01)

(58) Field of Classification Search
USPC .................. 711/130, 117, 118, 148; 709/213
See application file for complete search history.

(56) References Cited

U.S. PATENT DOCUMENTS

| | | | |
|---|---|---|---|
| 5,821,769 A | 10/1998 | Douseki | |
| 5,838,047 A | 11/1998 | Yamanchi et al. | |
| 6,000,007 A | 12/1999 | Leung et al. | |
| 6,038,644 A | 3/2000 | Irie et al. | |
| 6,138,208 A | 10/2000 | Dhong et al. | |
| 6,215,898 B1 | 4/2001 | Woodfill et al. | |
| 6,289,438 B1* | 9/2001 | Takayanagi | 712/218 |
| 6,404,239 B1 | 6/2002 | Kawahara et al. | |
| 6,404,902 B1 | 6/2002 | Takano et al. | |
| 6,456,737 B1 | 9/2002 | Woodfill et al. | |
| 6,535,433 B2 | 3/2003 | Ooishi | |
| 6,567,622 B2 | 5/2003 | Phillips | |
| 6,651,145 B1 | 11/2003 | Jamil et al. | |
| 6,661,931 B1 | 12/2003 | Kawada | |
| 6,744,931 B2 | 6/2004 | Komiya et al. | |
| 6,829,378 B2 | 12/2004 | DiFilippo et al. | |
| 6,922,783 B2 | 7/2005 | Knee et al. | |
| 7,028,196 B2 | 4/2006 | Soltis, Jr. et al. | |
| 7,039,818 B2 | 5/2006 | Deng et al. | |
| 7,080,267 B2 | 7/2006 | Gary et al. | |
| 7,095,882 B2 | 8/2006 | Akahori | |
| 7,102,777 B2 | 9/2006 | Haraguchi | |
| 7,142,725 B2 | 9/2006 | Haraguchi | |
| 7,168,070 B2 | 1/2007 | Archambault et al. | |
| 7,240,160 B1 | 7/2007 | Hetherington et al. | |
| 7,260,677 B1* | 8/2007 | Vartti et al. | 711/112 |
| 7,418,368 B2 | 8/2008 | Kim et al. | |
| 7,436,205 B2 | 10/2008 | Tada | |
| 7,521,762 B2 | 4/2009 | Nidaka | |
| 7,531,944 B2 | 5/2009 | Itoh | |
| 7,685,354 B1 | 3/2010 | Hetherington et al. | |
| 7,804,329 B2 | 9/2010 | Cho et al. | |
| 8,082,397 B1* | 12/2011 | Ezra | G06F 12/084 711/118 |
| 8,806,129 B2 | 8/2014 | Duvalsaint et al. | |
| 9,122,617 B2 | 9/2015 | Mercado et al. | |
| 2002/0129208 A1 | 9/2002 | Barroso et al. | |
| 2003/0080782 A1 | 5/2003 | Bailey et al. | |
| 2003/0114205 A1 | 6/2003 | Yamashita | |
| 2004/0059875 A1* | 3/2004 | Garg et al. | 711/141 |
| 2004/0210795 A1 | 10/2004 | Anderson | |
| 2005/0034002 A1 | 2/2005 | Flautner | |
| 2005/0083338 A1 | 4/2005 | Yun et al. | |
| 2005/0144223 A1 | 6/2005 | Yang et al. | |
| 2005/0263678 A1 | 12/2005 | Arakawa | |
| 2005/0268039 A1 | 12/2005 | Archambault et al. | |
| 2005/0289365 A1 | 12/2005 | Bhandarkar | |
| 2006/0013473 A1 | 1/2006 | Woodfill et al. | |
| 2006/0015772 A1* | 1/2006 | Ang et al. | 714/7 |
| 2006/0022742 A1 | 3/2006 | Parris et al. | |
| 2006/0250514 A1 | 11/2006 | Inoue et al. | |
| 2006/0268357 A1 | 11/2006 | Vook et al. | |
| 2007/0159642 A1 | 7/2007 | Choi | |
| 2007/0159842 A1 | 7/2007 | Choi | |
| 2008/0015772 A1* | 1/2008 | Sanma et al. | 701/207 |
| 2008/0084775 A1 | 4/2008 | Hoberman et al. | |
| 2008/0122479 A1 | 5/2008 | Hideto | |
| 2010/0127730 A1 | 5/2010 | Duvalsaint et al. | |
| 2010/0131712 A1 | 5/2010 | Duvalsaint et al. | |
| 2010/0131713 A1 | 5/2010 | Duvalsaint et al. | |
| 2010/0131716 A1 | 5/2010 | Duvalsaint et al. | |
| 2010/0131717 A1 | 5/2010 | Duvalsaint et al. | |

FOREIGN PATENT DOCUMENTS

| | | |
|---|---|---|
| CN | 1871587 A | 11/2006 |
| EP | 1662389 A2 | 5/2006 |
| EP | 1863177 A2 | 12/2007 |
| WO | 95/25306 A2 | 9/1995 |
| WO | 9525306 A2 | 9/1995 |

OTHER PUBLICATIONS

Manu Thapar, Bruce Delagi, and Michael J. Flynn. 1991. Scalable Cache Coherence for Shared Memory Multiprocessors. In Proceedings of the First International ACPC Conference on Parallel Computation, Hans P. Zima (Ed.). Springer-Verlag, London, UK, UK, 1-12.*
Prosecution History for U.S. Appl. No. 12/275,508.
Prosecution History for U.S. Appl. No. 12/275,552.
Prosecution History for U.S. Appl. No. 12/276,069.
Prosecution History for U.S. Appl. No. 12/275,521.
Information Materials for IDS dated Jun. 22, 2011.
Information Materials for IDS.
Bibliographic Data for CN1474969(A) with English Abstract.
Bibliographic Data for CN1871587(A) with English Abstract.
Bibliographic Data for CN1427340(A) with English Abstract.
U.S. Appl. No. 12/276,069, Office Action, dated Mar. 21, 2013, 31 pages.
U.S. Appl. No. 12/276,069, Office Action, dated Mar. 26, 2014, 13 pages.
U.S. Appl. No. 12/276,069, Office Action, dated Nov. 28, 2012, 17 pages.
Ulrich Drepper, Memory Part 2: CPU Cache, 2007, http://lwn.net/Articles/252125/.
U.S. Appl. No. 12/275,508, Office Action, dated May 23, 2013, 21 pages.
U.S. Appl. No. 12/275,508, Notice of Allowance, dated Mar. 28, 2014, 41 pages.
U.S. Appl. No. 12/275,552, Office Action, dated Mar. 25, 2014, 44 pages.
U.S. Appl. No. 12/275,552, Office Action, dated Sep. 10, 2012, 64 pages.
U.S. Appl. No. 12/275,552, Office Action, dated Jun. 26, 2014, 16 pages.
U.S. Appl. No. 12/275,552, Office Action, dated May 23, 2013, 16 pages.
U.S. Appl. No. 12/275,508, Office Action, dated Sep. 7, 2012, 21 pages.
U.S. Appl. No. 12/275,508, Office Action, dated Mar. 29, 2011, 25 pages.
U.S. Appl. No. 12/275,508, Final Office Action, dated Jun. 10, 2011, 17 pages.
U.S. Appl. No. 12/276,069, Office Action, dated Mar. 14, 2011, 23 pages.
U.S. Appl. No. 12/275,552, Office Action, dated Mar. 10, 2011, 22 pages.
U.S. Appl. No. 12/275,552, Final Office Action, dated Jun. 7, 2011, 15 pages.
U.S. Appl. No. 12/275,552, Examiner's Answer, dated Oct. 24, 2014, 14 pages.
U.S. Appl. No. 12/275,521, Notice of Allowance, dated May 21, 2010, 12 pages.
U.S. Appl. No. 12/276,069, Office Action, dated Sep. 11, 2014, 19 pages.
U.S. Appl. No. 12/276,069, Final Office Action, dated Jan. 14, 2015, 14 pages.
U.S. Appl. No. 12/276,069, Notice of Allowance, dated Apr. 29, 2015, 12 pages.

(56) References Cited

OTHER PUBLICATIONS

Mercado, Ramon, U.S. Appl. No. 12/275,552, Office Action, dated Dec. 9, 2016, 22 pgs.
Ramon A. Mercado, USPTO Notice of Allowance and Fee(s) Due, U.S. Appl. No. 12/275,552, dated Jul. 11, 2017, 61 pages.
Levacq, D. et al., Backgate Bias Accelerator for 10ns-order Sleep-to-Active Modes Transition time, IEEE Asian Solid-State Circuits Conference, Nov. 2007, pp. 296-299.
Kim, K. et al., "Back-Gate Controlled Wide Tunable Range Diode Voltage in Asymmetrical Double-Gate Devices", IEEE International SOI Conference Proceedings, Oct. 2006, pp. 151-152.
Makino, H. et al., "An Auto-Backgate-Controlled MT-CMOS Circuit", 1998 Symposium on VLSI Circuits Digest of Technical Papers, Jun. 1998, pp. 42-43.
Notice of Allowance dated May 21, 2010 for U.S. Appl. No. 12/275,521, filed Nov. 21, 2008.
Mercado, Ramon, U.S. Appl. No. 12/275,552, Final Office Action, dated May 31, 2017, 13 pgs.

\* cited by examiner

CACHE MEMORY BYPASS IN A MULTI-CORE PROCESSOR (MCP)

CROSS-REFERENCE TO RELATED APPLICATIONS

This application is related in some aspects to commonly owned and co-pending 12/275,521, entitled "Charge Transfer for Digital Circuits," filed Nov. 21, 2008, the entire contents of which are herein incorporated by reference. This application is also related in some aspects to commonly owned and co-pending 12/275,508, entitled "Mounted Cache Memory in a Multi-Core Processor (MCP)," filed Nov. 21, 2008, the entire contents of which are herein incorporated by reference. This application is also related in some aspects to commonly owned and co-pending 12/275,552, entitled "Cache Memory Sharing in a Multi-Core Processor (MCP)," filed Nov. 21, 2008, the entire contents of which are herein incorporated by reference. This application is also related in some aspects to commonly owned and co-pending 12/276,069, entitled "Pseudo Cache Memory in a Multi-Core Processor (MCP)," filed Nov. 21, 2008, the entire contents of which are herein incorporated by reference.

FIELD OF THE INVENTION

The preset invention generally relates to multi-core processors (MCP). Specifically, the present invention relates to the bypassing of low yield or dead cache memory units in a MCP.

BACKGROUND OF THE INVENTION

Multi-Core Processor (MCP) with hierarchical architecture is a trend for state-of-the-art digital system. Typically, MCPs are implemented with aggressively scaled nanometer CMOS technologies to have high device density and multi-core design. On the other hand, yield failure is caused by the process variability and defects in nanometer CMOS manufacturing. With the hierarchical architecture, a partial failure causes extensive damage to the components in the tree hierarchy and architecture. Therefore, system design and operation methods to salvage operational component blocks are essential to improve product yield as well as to increase the reliability.

SUMMARY OF THE INVENTION

This invention describes an apparatus, computer architecture, memory structure, memory control, and cache memory operation method for multi-core processor. A logic core bypasses immediate cache memory units with low yield or deadly performance. The core mounts (multiple) cache unit(s) that might already be in use by other logic cores. Selected cache memory units serve multiple logic cores with the same contents. The shared cache memory unit(s) serves all the mounting cores with cache search, hit, miss, and write back functions. The method recovers a logic core whose cache memory block is not operational by sharing cache memory blocks which might already engage other logic cores. The method is used to improve reliability and performance of the remaining system.

A first aspect of the present invention provides a bypass memory system, comprising: a first memory unit mounted on a bus; a first cache manager coupled to the first memory unit; and a second memory unit mounted on the bus, the first cache manager being operable to: receive a request, bypass the first memory unit with the request, and send the request to the second memory unit.

A second aspect of the present invention provides a cache memory bypass system, comprising: a first cache memory unit mounted on a bus; a first cache manager coupled to an input and an output of the first cache memory unit; a first set of sub-cache memory units coupled to the first cache manager; a second cache memory unit mounted on the bus; a second cache manager coupled to an input and an output of the second cache memory unit; and a second set of sub-cache memory units coupled to the second cache manager, the first cache manager and the second cache manager each being operable to: receive a request, bypass a cache memory unit to which it is coupled, and send the request to different cache memory unit.

A third aspect of the present invention provides a memory bypass method, comprising: receiving a first request on a cache manager, the first cache manager being coupled to a first memory unit, the first memory unit being coupled to a bus; and bypassing the first memory unit by sending the first request from the first cache manager to a second cache manager, the second cache manager being coupled to a second memory unit, the second memory unit being coupled to the bus.

BRIEF DESCRIPTION OF THE DRAWINGS

These and other features of this invention will be more readily understood from the following detailed description of the various aspects of the invention taken in conjunction with the accompanying drawings in which.

Figure 1:
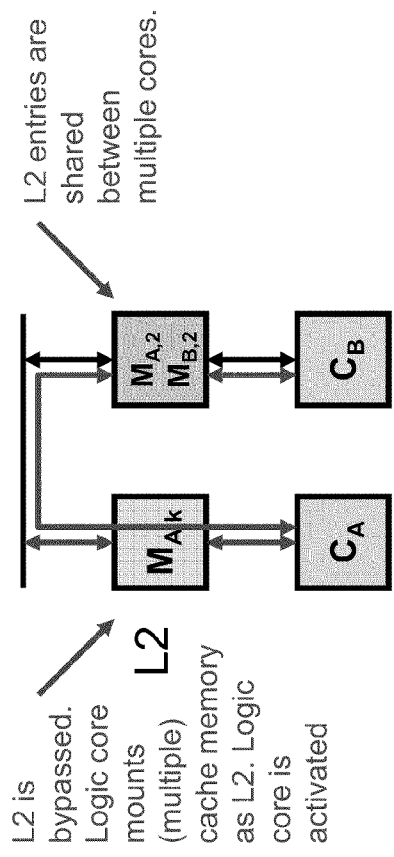
FIG. 1 depicts the comparison of cache memory bypass according to the present invention versus a conventional method.
Figure 1:
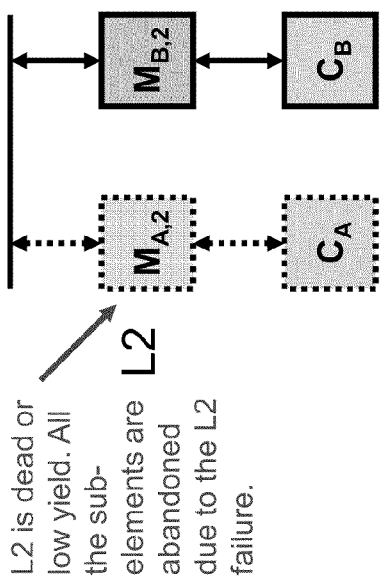

It should be understood that the drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. General Description
II. Illustrative Example

I. GENERAL DESCRIPTION

As indicated above, this disclosure describes an apparatus, computer architecture, memory structure, memory control, and cache memory operation method for multi-core processor. Specifically, under the present invention an available on-chip memory is coupled to another logic core or memory (e.g., cache) unit using a set of cache managers. Specifically, each cache manager is coupled to the input and output of a cache memory unit. This allows the assigned memory to become an extension of the same level cache, next level cache memory, or memory buffer. This also allows recovers a memory block whose logic core is not operational, and is used to improve cache memory performance of the system. It should be understood in advance the teachings herein are typically applied to a Multi-Core Processor (MCP), although this need not be the case. In addition, it should be understood although this disclosure discusses memory units as being (virtual) cache or sub-cache memory units, this is only one example of the way in which in the teachings recited herein could be implemented. As such, it should be understood that these teachings could be implemented in conjunction with any type of memory now known or later developed.

Multi-Core Processor (MCP) with hierarchical architecture is a trend for state-of-the-art digital system. And they are implemented with aggressively scaled nanometer CMOS technologies to have high device density and multi-core design. On the other hand, yield failure is caused by the process variability and defects in nanometer CMOS manufacturing. With the hierarchical architecture, a partial failure causes extensive damage to the components in the tree hierarchy and architecture. The invention is to improve the yield and the reliability of the MCP. This design includes architecture, memory structure, memory control, and cache memory operation method.

State-of-the-art digital systems employ multi-core processor architecture as shown below. They are arranged hierarchically for efficient operation and computation management and design scalability. Since they assume that all the components in the hierarchy are sound, one slight failure would cause catastrophic failure to the components in the tree architecture. The invention addressed a case especially when a memory block is intact, while logic components are damaged in the course of manufacturing, aging, and other reasons. In conventional design, all the components in the hierarchy and tree are abandoned, and it results in very expensive losses in MCP products. The invention proposes to ignore, separate, and bypass the immediate non-operational memory block belongs to a logic core, and to mount additional & available memory to the operational logic core. A cache manager wraps each cache memory at the same level for the operation—bypass, mount, and share. By revitalizing the logic core, the MCP computational power is restored partially. Among other things, the method improves chip performance and resilience to manufacturing defects.

FIG. 1 depicts the comparison of cache memory bypass according to the present invention versus a conventional method. Under the conventional method, when $M_{A2}$ is dead or producing low yield, all the sub-processing elements are abandoned due to the failure of $M_{A2}$. Conversely, under the present invention, when $M_{Ak}$ is dead or producing low yield, $M_{Ak}$ is bypassed while allowing its sub-processing elements remain functional. In bypassing $M_{Ak}$, inbound requests will be redirected to $M_{A2}$ $M_{B2}$ via cache managers as described below.

Figure 2:
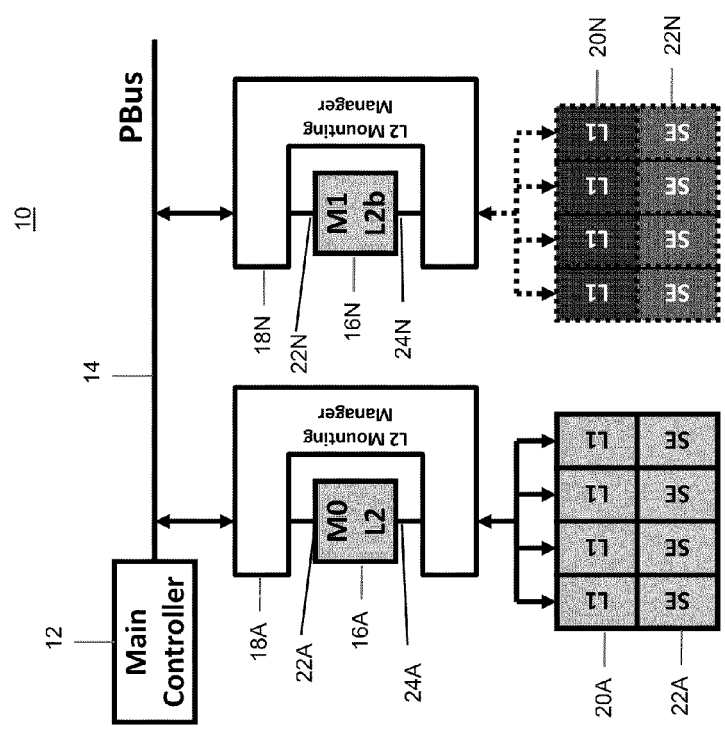
FIG. 2 depicts a cache memory bypass system according to the present invention.

Referring now to FIG. 2, a bypass cache memory system 10 according to the present invention is shown. As depicted, system 10 includes a main controller 12, a bus 14, a set (at least one) of cache memory units 16A-N coupled to bus 14, a set (at least one) of sub-cache memory units 20A-N coupled to set of cache memory units 16A-N, and a set (at least one) of sub-processing elements 22A-N coupled to sub-cache memory units 20A-N. Also shown in FIG. 1 is a set of cache managers 18A-N. As depicted, each cache manager 18A-N is coupled to an input 24A-N and an output 26A-N of a cache memory unit 16A-N.

Cache managers 18A-N foster communication among the components of FIG. 1. By using cache managers both cache memory units 16A-N can be isolated from logic cores. In the of cache memory unit 16A, failing memory is isolated. In cache memory unit 16N, memory can be shared among different logic cores with the cache manager. One type of such communication is memory requests. This can be especially useful when one memory unit "misses" or fails to satisfy the request, another memory unit (vertically within the hierarchy or adjacent) can be so requested. The cache memory mounting operation is done by finding dead logic and live memory in the MCP. Any live memory block with dead logic core can be dedicated to another memory or logic core, as a cache or a memory buffer. It does not have to be one-to-one relationship. A main controller at the top hierarchy manages mounting process, by performing diagnosis on memories and cores. Cache manager receives (1) normal cache, (2) mounting or (3) being mounted instructions from the main controller. Main controller 12 communicates with cache managers 18A-N through bus 14. Cache managers 18A-N remember their status, and performs following cache operation steps: wrapping cache memory unit input and output; configuring cache memory unit bypassing; configuring cache mounting information; and arranging cache input and output for sharing. The method can be applied to many different cases.

II. ILLUSTRATIVE EXAMPLE

Figure 3:
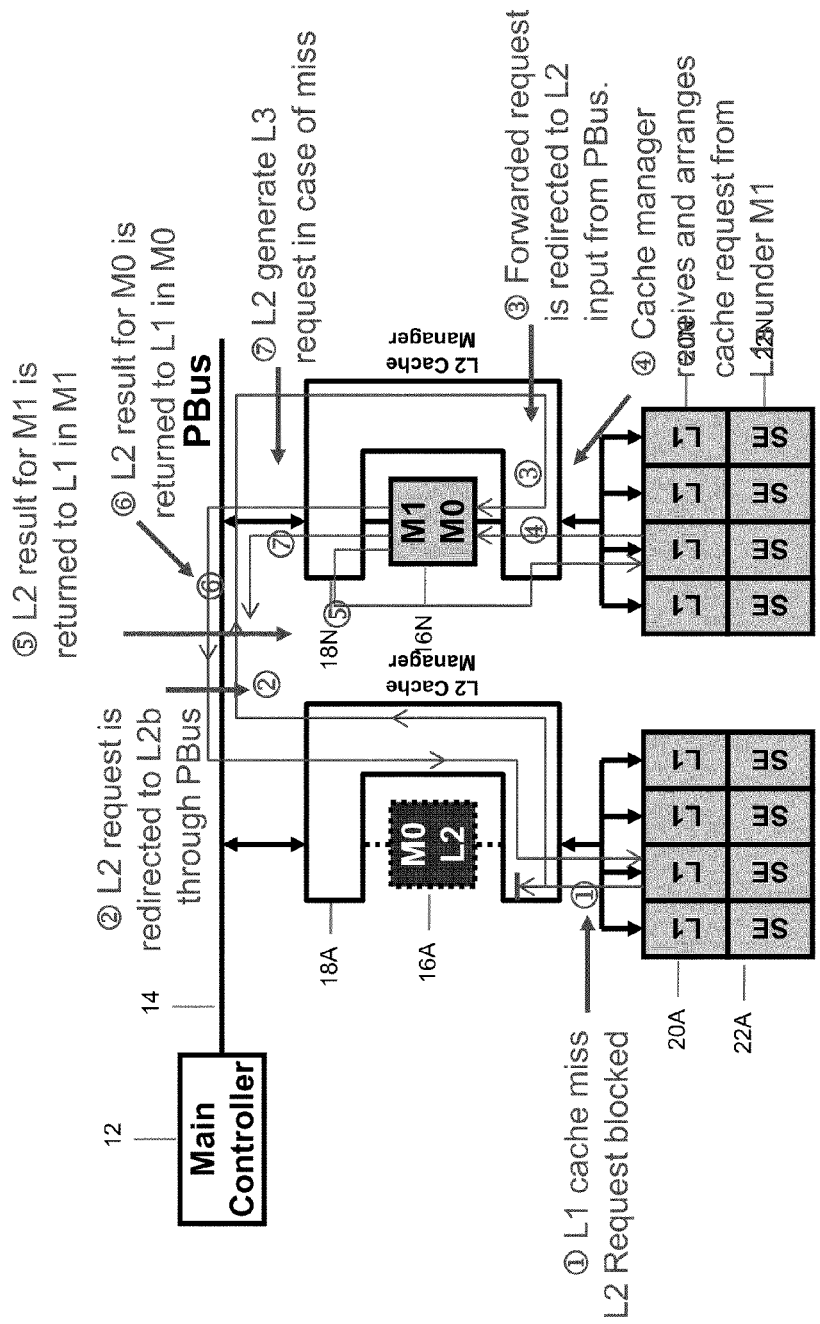
FIG. 3 depicts a progression of events involved with processing requests using the cache memory bypass system of FIG. 1 according to one example of the present invention.

FIG. 3 shows a progression of events for such an example. In this example, it is assumed that cache memory unit 16A is inoperable. In step 1, sub-processing element 22A sends a request to sub-cache memory unit for a piece of a memory content, which sub-cache memory unit 20A does not have (cache miss). Sub-cache memory unit 20A then generates a request for cache memory unit 16A. Cache manager 18A blocks the request. In step 2, cache manager 18A redirects the search request to cache memory unit 16N via bus 14. In step 3, cache manager 16N redirects the incoming request to the input of cache memory unit 16N. In step 4, cache memory unit 16N responds to sub-cache memory unit 20A with either a cache hit or miss. If it is a hit, no further operation is needed and the following responses and operations can be ignored.

In step 5, if cache memory unit 16N the memory address, it will generate a L3 cache memory request (usually external memory on board) that is sent to a third cache memory unit (not shown) with bus 14. The L3 and remote cache search results are written back to cache memory unit 16A based on the return order and priority.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A bypass memory system, comprising:
 a first set of sub-memory elements mounted on a bus in a Multi-Core Processor (MCP) with hierarchical architecture;
 a first memory unit mounted on the bus between the first set of sub-memory elements and the bus, the first memory unit being dedicated to the first set of sub-memory elements;

a first cache manager coupled to an input and an output of the first memory unit;

a second memory unit mounted on the bus between a second set of sub-memory elements and the bus, the second memory unit being on an equal hierarchical level to the first memory unit and being dedicated to the second set of sub-memory elements;

a main controller mounted on the bus and coupled to the first cache manager and a second cache manager and being operable to diagnose whether any of the first memory unit and the second memory unit is dead;

the first cache manager being operable to: disassociate, in response to a diagnosis from the main controller that the first memory unit is dead, the first memory unit permanently from the first set of sub-memory units such that the first cache manager bypasses the first memory unit for any request originating from a first set of sub-processing elements to the first set of sub-memory elements that is operational and send the request to the second memory unit via the bus; and the second cache manager coupled to an input and an output of the second memory unit, the second cache manager being operable to, couple, in response to the diagnosis from the main controller that the first memory unit is dead, the second memory unit to the first set of sub-memory units, allowing the coupled second cache memory to become an extension of a same level cache of the first memory unit, such that the second cache manager forwards the request from the first cache manager via the bus to the second memory unit for processing, and to manage operation between the second memory unit and the first set of sub-processing elements while the second memory unit continues to be dedicated to the second set of sub-processing units by sending the request to either of the following: the second memory unit, and an externally located third memory unit in the case that the second memory unit fails to satisfy the request.

2. The bypass memory system of claim 1, the first memory unit and the second memory unit comprising virtualized cache memory units.

3. The bypass memory system of claim 2, the second cache manager being further operable to receive an additional request, bypass the second memory unit with the additional request, and send the additional request to at least one of the following: the first memory unit; or the third memory unit.

4. The bypass memory system of claim 1,
wherein the first set of sub-memory units is coupled to the first cache manager, and
the first set of sub-processing elements is coupled to the first set of sub-memory units.

5. The bypass memory system of claim 4, further comprising:
a second set of sub-memory units coupled to the second cache manager; and
the second set of sub-processing elements coupled to the second set of sub-memory units.

6. The bypass memory system of claim 1, the first cache manager further bypassing the first memory unit when the first memory unit is inoperable.

7. The bypass memory system of claim 1, the first cache manager being coupled to an input and an output of the first memory unit.

8. A cache bypass system, comprising:
a first cache memory unit mounted on a bus in a Multi-Core Processor (MCP) with hierarchical architecture between the first set of sub-memory elements and the bus, the first memory unit being dedicated to the first set of sub-memory elements;

a first cache manager coupled to an input and an output of the first cache memory unit;

a first set of sub-cache memory units coupled to the first cache manager such that the first cache memory unit and the first cache manager are disposed between the first set of sub-cache memory units and the bus;

a second cache memory unit mounted on the bus and disposed between a second set of sub-memory elements and the bus, the second memory unit being on an equal hierarchical level to the first memory unit and being dedicated to the second set of sub-memory elements;

a second cache manager coupled to an input and an output of the second cache memory unit;

a main controller mounted on the bus and coupled to the first cache manager and the second cache manager and being operable to diagnose whether any of the first memory unit and the second memory unit is dead;

the first cache manager and the second cache manager being operable to: disassociate, in response to a diagnosis from the main controller that an associated cache memory unit is dead, the associated cache memory unit permanently from a dedicated set of sub-memory units such that the associated cache memory unit is bypassed for any a request originating from a first set of sub-processing elements to the dedicated set of sub-memory elements that is operational and send the request to different cache memory unit; and wherein the first cache manager and second cache manager are each operable to couple, in response to the diagnosis from the main controller that the associated memory unit is dead, the different cache memory unit to the dedicated set of sub-memory units, allowing the coupled second cache memory to become an extension of a same level cache of the first memory unit, such that a request from either the dedicated set of sub-memory units or a set of sub-memory units that were preciously dedicated to the different cache memory unit are both managed by sending the request to either of the following: the cache memory unit to which it is coupled, and an externally located different memory unit in the case the cache memory unit to which it is coupled to is unable to satisfy the request.

9. The cache bypass system of claim 8, further comprising the first set of sub-processing elements coupled to the first set of sub-cache memory units.

10. The cache bypass system of claim 8, further comprising a second set of sub-processing elements coupled to the second set of sub-cache memory units.

11. A memory bypass method, comprising:
diagnosing, by a main controller mounted on a bus in a Multi-Core Processor (MCP) with hierarchical architecture and coupled to a first cache manager and a second cache manager, whether a first memory unit is dead;

receiving a first request on the first cache manager originating from a first set of sub-processing elements to a first set of sub-memory elements that is operational, the first cache manager coupled to an input and an output of the first memory unit, the first memory unit being dedicated to the first set of sub-memory elements and being disposed between the first set of sub-memory elements and the bus;

bypassing permanently, in response to a diagnosis from the main controller that the first memory unit is dead, the first memory unit by sending the first request from the first cache manager to the second cache manager, the second cache manager being coupled to the second memory unit, the second memory unit being coupled to the bus, being on an equal hierarchical level to the first memory unit, being dedicated to a second set of sub-memory elements, being on an equal hierarchical level as the first memory unit, and being disposed between the second set of sub-memory elements and the bus; and wherein the second cache manager is operable to receive the request from the first cache manager, to couple the second memory unit to the first set of sub-memory units, allowing the coupled second cache memory to become an extension of a same level cache of the first memory unit, and to manage operation between the second memory unit and both the first set of sub-memory elements and the second set of sub-memory elements by sending the request to either of the following: the second memory unit, and an externally located third memory unit in the case that the second memory unit fails to satisfy the request.

12. The memory bypass method of claim 11, the second request being received from the second set of sub-memory units coupled to the second memory unit.

13. The memory bypass method of claim 12, the first memory unit, the first set of sub-memory units, the second memory unit, and the second set of sub-memory units being cache memory units.

14. The memory bypass method of claim 11, further comprising sending a response to the first request from the second memory unit to an originator of the request.

15. The memory bypass method of claim 14, the response being sent via the second cache manager.

16. The bypass memory system of claim 1, further comprising:
a third set of sub-memory elements mounted on a bus in the Multi-Core Processor (MCP) with hierarchical architecture;
a third memory unit mounted on the bus between the third set of sub-memory elements and the bus, the third memory unit being dedicated to the third set of sub-memory elements;
a third cache manager coupled to an input and an output of the third memory unit;
a fourth memory unit mounted on the bus between a fourth set of sub-memory elements and the bus, the fourth memory unit being on an equal hierarchical level to the third memory unit and being dedicated to the fourth set of sub-memory elements;
the third cache manager being operable to: disassociate, in response to a diagnosis from the main controller that the third memory unit is dead, the third memory unit permanently from the third set of sub-memory units such that the third cache manager bypasses the third memory unit for any request originating from a third set of sub-processing elements to the third set of sub-memory elements that is operational and send the request to the fourth memory unit via the bus; and
the fourth cache manager coupled to an input and an output of the fourth memory unit, the fourth cache manager being operable to: disassociate, in response to a diagnosis from the main controller that the fourth set of sub-memory elements is dead, the fourth memory unit permanently from the fourth set of sub-memory elements and, dedicate, in response to the diagnosis from the main controller that the third memory unit is not operating correctly, the fourth memory unit to the third set of sub-memory units such that the fourth cache manager forwards the request from the third cache manager via the bus to the fourth memory unit for processing by sending the request to either of the following: the fourth memory unit, and an externally located third memory unit in the case that the fourth memory unit fails to satisfy the request.

\* \* \* \* \*